United States Patent [19]

Child et al.

[11] 3,927,997

[45] Dec. 23, 1975

[54] METHANE-RICH GAS PROCESS

[75] Inventors: Edward T. Child, Tarrytown, N.Y.; Allen M. Robin, Anaheim, Calif.

[73] Assignee: Texaco Inc., New York, N.Y.

[22] Filed: Dec. 28, 1973

[21] Appl. No.: 429,467

[52] U.S. Cl................ 48/197 R; 48/215; 252/373; 260/449 M
[51] Int. Cl.[2]............................................ C10J 3/06
[58] Field of Search........... 48/215, 197 R; 252/373; 260/449 M

[56] References Cited
UNITED STATES PATENTS

| | | | |
|---|---|---|---|
| 2,963,348 | 12/1960 | Sellers | 48/197 R |
| 3,444,099 | 5/1969 | Taylor et al. | 48/197 R |
| 3,709,669 | 1/1973 | Marion et al. | 48/215 |
| 3,740,204 | 6/1973 | Slater et al. | 48/215 |
| 3,816,332 | 6/1974 | Marion | 48/215 |

*Primary Examiner*—S. Leon Bashore
*Assistant Examiner*—George C. Yeung
*Attorney, Agent, or Firm*—T. H. Whaley; C. G. Ries; Albert Brent

[57] ABSTRACT

A methane-rich gas stream is produced by catalytic methanation of synthesis gas feed comprising $H_2$ and CO. When the mole % CO in the synthesis gas feed to the methanator is greater than 10 mole %, and the mole ratio $H_2/CO$ is in the range of greater than 1.0 to 3, by adjusting the mole % $CO_2$ in the synthesis gas feed to the methanator to a value in the range of about 0.5 to 20, and the mole ratio $H_2/CO_2$ in the range of about 2 to 60 and preferably less than 3.9 it was unexpectedly found that a product gas is produced having a gross heating value which is greater than that which is obtained from a dry $CO_2$-free methanator feed gas.

16 Claims, No Drawings

METHANE-RICH GAS PROCESS

BACKGROUND OF THE INVENTION

1. Field of the Invention

This invention relates to an improved process for the production of methane-rich gas. More specifically, the present invention relates to the production of gaseous heating fuels having a gross heating value of at least 940 BTU per SCF from low cost hydrocarbonaceous materials. The product gas may be burned without polluting the environment.

2. Description of the Prior Art

A national dilemma exists as the result of a diminishing supply of natural gas and an increasing demand for it. The impact of the gas crisis is being felt nationwide in rising prices, in governmental regulations with respect to the consumption of natural gas, and in prohibitions against the use of natural gas in future commercial, industrial and apartment-house construction. It is imperative that alternate sources of low-cost gaseous heating fuels be developed.

In coassigned U.S. Pat. No. 3,688,438 synthesis gas was made having up to 26 volume percent of methane by the partial oxidation of a hydrocarbonaceous fuel using comparatively high steam to fuel weight ratios and no subsequent catalytic methanation step. In coassigned U.S. Pat. No. 3,709,669 the synthesis gas leaving the partial oxidation gas generator is subjected to an additional step involving the water gas shift reaction to adjust the $H_2/CO$ mole ratio to preferably 3 before catalytic methanation.

In comparison with the prior art, by the subject invention the mole % $CO_2$ in the feed gas to the catalytic methanation zone is controlled. A product gas is produced having a gross heating value (after $H_2O$ and $CO_2$ are removed.) which is greater than the gross heating value obtained when the feed gas to the methanator contains no moisture or $CO_2$.

One economic benefit of the subject invention is the elimination of the troublesome water-gas shift reaction considered essential by prior art processes to adjust the $H_2/CO$ ratio of the feed gas stream to the methanator.

SUMMARY

It was unexpectedly found that in the catalytic methanation of synthesis gas, i.e. mixtures of $H_2+CO$, when the mole % CO in the synthesis gas feed to the methanator is greater than 10 mole % CO and the mole ratio $H_2/CO$ is in the range of about 1.0 to 3.0, the amount of $CH_4$ produced is substantially increased by adjusting the mole % $CO_2$ in the feed gas to the methanator to a value in the range of 0.5 to 20, and the mole ratio $H_2/CO_2$ in the range of about 2 to 60, and preferably less than 3.9.

Criticality was shown in a preferred embodiment of the invention. The gross heating value of the product gas (with $H_2O$ and $CO_2$ removed) was maximized by adjusting the mole % $CO_2$ in the synthesis gas feed to the methanator to a critical value in the range of 0.5 to 20 and preferably 5 to 15.0 while maintaining the $H_2/CO$ mole ratio of the synthesis gas feed to a critical value in the range of greater than 1 to 3 and preferably 2.5.

One embodiment of the subject invention includes the steps of partial oxidation of a hydrocarbonaceous fuel feed to produce a process gas stream comprising mixtures $H_2$ and CO (having a critical mole ratio $H_2/CO$ in the range of greater than 1.0 to 3.0), $H_2O$, $CH_4$, $CO_2$, minor amounts of particulate carbon, and one or more gaseous impurities of the group $H_2S$, COS, $N_2$, and Ar; cooling the process gas stream and removing particulate carbon, $H_2O$, $CO_2$ and gaseous impurities therefrom; adjusting the mole % $CO_2$ in the process gas stream to a value in the range of about 0.5 to 20 and the temperature to a value in the range of about 390°F. to 1000°F.; and introducing the process gas stream into a catalytic methanation zone where said $H_2$ and CO are reacted together to produce an effluent gas stream comprising $CH_4$ and containing gaseous impurities selected from the group consisting of $H_2O$, $CO_2$, and mixtures thereof; and removing said gaseous impurities to produce a methane-rich product gas stream comprising about 92 to 98 mole % methane or higher (dry basis).

The product gas may be used as a clean fuel gas having a gross heating value of about 940 BTU/SCF or higher; or it is suitable for use in chemical synthesis. Further, it may be burned as a fuel without polluting the atmospheres.

DESCRIPTION OF THE INVENTION

The present invention relates to a continuous process for producing a methane-rich gas stream comprising 92 to 98 mole % $CH_4$ or more (dry basis).

In one important step in the subject process, CO and $H_2$ in the process gas stream are reacted together to produce methane in a catalytic methanator. Since the desired methanation reaction may be assumed to be $2CO+2H_2 = CH_4+CO_2$, one would believe that the methane content of the effluent gas stream from the methanator would increase as the $CO_2$ content of the gaseous feed to the methanator is decreased. This conclusion is based on thermodynamic calculations using the above cited reaction in which $CO_2$ appears on the right hand side of the equilibrium equation together with $CH_4$.

However, it was unexpectedly found that over the normal operating range of temperature and pressure when the mold % CO in the synthesis gas feed to the methanator is greater than 10 and the mole ratio $H_2/CO$ in the feed gas to the methanator was in the range of greater than 1.0 to 3, suitably about 2.2 to 2.8 and preferably about 2.5 to 2.8, the gross heating value of the effluent gas from the methanator could be increased to a value above that obtained when the feed to the methanator was dry i.e. 0 mole % $H_2O$ and contained no $CO_2$ by adjusting the mole % $CO_2$ in the feedgas to a value in the range of about 0.5 to 20, suitably about 1.0 to 15, and preferably about 10 to 15; and by adjusting the mole ratio $H_2/CO_2$ in the range of about 2 to 60, suitably 2 to 4, and preferably less than 3.9. The beneficial effect of adding $CO_2$ to a dry $CO_2$-free methanator feedgas stream increased as the $H_2/CO$ of the feedgas stream increased above 1.13. When the $H_2/CO$ mole ratio in the feedgas to the methanator was less than 1.13, the gross heating value of the effluent gas from the methanator actually decreased as the mole % $CO_2$ in the feedgas to the methanator was increased above 0.

Further, it was unexpectedly found that the gross heating value of the effluent gas stream from the methanator after $H_2O$ and $CO_2$ were removed could be maximized to a value in the range of about 940 to 1000 BTU/SCF by maintaining a critical mole ratio $H_2/CO$ in the feed gas to the methanator in the range of greater than 1.0 to 3.0 suitably 2.2 to 2.8 and preferably 2.5 to 2.8, while adjusting the mole % $CO_2$ to a critical value in the range of 0.5 to 20 preferably 10–15.

In the first step of a preferred embodiment of the process, synthesis gas comprising hydrogen, carbon monoxide, carbon dioxide, water vapor, methane, and containing one or more members of the group consisting of nitrogen, argon, carbonyl sulfide, hydrogen sulfide, and entrained particulate carbon is produced by the reaction of a hydrocarbonaceous fuel by partial oxidation with substantially pure oxygen and a temperature moderator in the reaction zone of a free-flow synthesis gas generator free from packing or catalyst. The composition of the charge and the conditions of the reaction may be controlled so as to produce an effluent gas stream containing more than 10 mole % CO and a mole ratio $H_2/CO$ in the range of greater than 1.0 to 3.0 and from about 0.1 to 13 weight percent (wt. %) of entrained particulate carbon (basis weight of carbon in the hydrocarbonaceous fuel).

Hydrocarbonaceous fuels which are suitable feedstocks for the process include by definition various petroleum distillate and residua, naphtha, gas oil, residual fuel, asphalt, reduced crude, whole crude, coal tar, coal oil, shale oil and tar sand oil. Included also are pumpable slurries of solid hydrocarbonaceous fuels e.g., coal, particulate carbon, and petroleum coke in a liquid hydrocarbon fuel carrier such as previously listed, or water.

The temperature moderator is selected from the group consisting of $H_2O$, $CO_2$, and mixtures thereof. $H_2O$ is the preferred temperature moderator and may be supplied to the generator in liquid or gaseous phase. It may be introduced either separately or in admixture with the free oxygen containing gas or with the hydrocarbonaceous feedstocks, or both. Water will moderate the temperature of the reaction zone and may also react with CO and the hydrocarbon fuel in the reaction zone of the gas generator. The preferred weight ratio of $H_2O$ to hydrocarbonaceous fuel in the feed to the generator in the subject invention is in the narrow range of 0.5 to 5.0, and preferably 2.0 to 5.0.

The free-oxygen containing gas is introduced into the reaction zone of the synthesis gas generator simultaneously with the $H_2O$ and hydrocarbonaceous fuel. Suitably, an annulus-type burner, such as described in coassigned U.S. Pat. No. 2,928,460 issued to du Bois Eastman et al., or in coassigned U.S. Pat. No. 3,743,606 issued to C. P. Marion et.al., may be employed. The substantially pure oxygen may be introduced at a temperature in the range of about ambient to 1000°F. The substantially pure oxygen comprises 95 mole % $O_2$ or more and preferably 99 mole % $O_2$ or more. Substantially pure oxygen is preferred so as to avoid major amounts of nitrogen and argon in the effluent gas. The amount of oxygen supplied is controlled so as to prevent complete oxidation of the hydrocarbonaceous feed and to control the temperature in the reaction zone. The atomic ratio of oxygen in the substantially pure oxygen to carbon in the hydrocarbonaceous fuel is in the range of about 0.8 to 1.0.

The reaction zone is preferably a conventional Texaco Synthesis Gas Generator. The synthesis gas generator is free from any obstructions to the free flow of the gases therethrough. The gas generator is a cylindrically shaped vertical steel pressure vessel whose inside walls are lined with refractory. An axially aligned flanged inlet port is located at the top of the vessel, and flanged outlet port is located at the bottom. The various feedstreams may be introduced into the gas generator at ambient temperature, but preferably they are introduced at a temperature in the range of about 100°F to 1000°F. Preferably, an annulus-type burner which is axially mounted in the top flanged port of the generator may be used for introducing and mixing the feedstreams.

Suitable gas generators are disclosed in coassigned U.S. Pat. Nos. 2,818,326 and 3,000,711 to du Bois Eastman et al. The size of the reaction chamber is selected so that the average residence time of the reactants and resulting reaction products within the reactor is within the range of 0.5 to 20 seconds, and preferably 1 to 8 seconds.

In the reaction zone of the free-flow noncatalytic synthesis gas generator, reaction takes place at an autogenous temperature in the range of about 1700° to 3100°F. and preferably in the range of about 1800° to 2600°F., and at a pressure in the range of about 1 to 250 atmospheres gauge and preferably in the range of about 20 to 200 atmospheres gauge.

The effluent gas stream from the gas generator has the following dry gas composition in mole %: $H_2$ 26 to 59; CO 10 to 49; $CO_2$ 5 to 40; $CH_4$ 5 to 25; $H_2S$ nil to 2.0; COS nil to 0.1; $N_2$ nil to 0.3; Ar nil to 0.3; and from 0.1 to 13 wt. % of particulate carbon (basis C in hydrocarbonaceous fuel). The mole ratio $H_2/CO$ is in the range of about 1.0 to 3.0.

By conventional means, the effluent gas stream from the generator is cooled, and the particulate carbon and gaseous impurities are removed. For example, the effluent gas stream may be passed through an in-line wasteheat boiler and cooled to a temperature in the range of about 400° to 800°F. by indirect heat exchange with water, thereby producing steam. The steam may be used elsewhere in the process, such as in the gas generator. Alternately, the effluent gas stream from the gas generator may be quenched in water in a quench tank such as shown in coassigned U.S. Pat. No. 2,896,927. Advantageously, by this means a large portion of the particulate carbon and other solids entrained in the effluent gas stream is removed by the quench water.

Further, particulate carbon and any other entrained solids may be removed from the effluent gas stream by well known scrubbing techniques in a gas-liquid scrubbing zone. For example, the particulate carbon may be removed by scrubbing the process gas with a scrubbing fluid comprising oil, water, or both. The slurry of particulate carbon and scrubbing fluid may be recycled to the gas generator as a portion of the feedstock.

When oil is used as the scrubbing fluid, preferably the temperature of the scrubbing oil is kept below its cracking temperature and above the dewpoint of $H_2O$ in the process gas stream. In one embodiment of our process, the process gas stream is introduced into a liquidgas tray-type column, such as more fully described in Perry's Chemical Engineers' Handbook Fourth Edition, McGraw Hill 1963, Pages 18–3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of the synthesis gas generator as a portion of the hydrocarbonaceous feedstock.

When required, additional scrubbing may be provided to supplement the aforesaid gas scrubbing. For example, the gas stream may be quenched in hydrocarbon oil or washed with a liquid hydrocarbon fuel by means of a scrubbing nozzle or venturi scrubber, such as described in Perry's Chemical Engineers' Handbook Fourth Edition, McGraw Hill 1963, Pages 18–54 to 56. The process gas stream leaving from the top of the scrubbing tower substantially free from particulate carbon and at a temperature in the range of aboug 400° to 650°F. is then cooled to condense out and separate any volatilized hydrocarbons and water found therein. For additional information on suitable gas scrubbing, reference is made to coassigned U.S. Pat. No. 3,639,261.

$CO_2$, $H_2O$, $H_2S$, and COS may be removed from the process gas stream in an acid-gas separation zone by a suitable conventional process involving refrigeration and physical or chemical absorption with solvents, such as methylalcohol, n-methyl pyrrolidone, triethanolamine, propylene carbonate, or alternately with hot potassium carbonate. Methane should be substantially insoluble in the solvent selected. Most of the $CO_2$ absorbed in the solvent can be released by simple flashing, the rest being removed by stripping. This may be done most economically with impure nitrogen that is available free of cost when an air-separation unit is used to provide oxygen for the gasification step. The stream of $CO_2$ has a purity of more than 98 percent and may therefore be used subsequently in the process to adjust the mole % $CO_2$ on the feed gas stremm to the methanator. Alternately, it may be used for organic synthesis or returned to the gas generator as the temperature moderator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly $H_2S$ and COS-containing solvent is regenerated by further flashing and stripping with nitrogen. The $H_2S$ and COS may be then converted into sulfur by a suitable process. For example, the Claus process may be used to produce elemental sulfur from $H_2S$, as described in Kirk-Othmer Encyclopedia of Chemical Technology, Second Edition Volume 19, John Wiley, 1969, Page 352.

By the subject invention, the methanation of typical synthesis gas streams can be unexpectedly improved by adjustment of the feed gas to contain critical amounts of $CO_2$ i.e., 0.5 to 20 mole % if the objective is to maximize the heating value of the product gas after $CO_2$ and $H_2O$ removal. The $CO_2$ will also serve to moderate the exothermic nature of the methanation reaction. Further, it is theorized that such reactions as the water gas shift reaction takes place in addition to methanation. Both of these reactions may be catalyzed by similar catalysts that contain large amounts of nickel.

The process gas stream after adjustment of the $CO_2$ content has the following composition in mole percent $H_2$ 26 to 60, CO 10 to 50, $CH_4$ 5 to 26, $CO_2$ 0.5 to 20, $H_2O$ 0.0, $N_2$+Ar nil to 0.6 and 0 to less than about 500 parts per million of total sulfur i.e. $H_2S$+COS.

The mole % $CO_2$ in the process gas stream may be adjusted to a value in the range of about 0.5 to 20 mole % by any suitable procedure. For example, this may be done by removing substantially all of the $CO_2$ from the process gas stream in the acid-gas separation zone, as previously described. A portion of the substantially pure stream of $CO_2$, e.g. 98 mole % $CO_2$ or more from the acid-gas separation zone is then admixed with the feed gas stream to the methanator to produce a feed gas mixture containing the desired amount of $CO_2$.

Alternately, the $CO_2$ content in the process gas stream may be adjusted to the amount previously specified by removing only part of the excess $CO_2$ in the process gas stream and all of the other acid gases by conventional means in the acid-gas separation zone. The Lurgi-Linde Rectisol process which uses a cold methanol solvent or a similar conventional process may be used.

For example, the gas stream before entering a conventional solvent absorption tower is continuously analyzed by a gas chromatagraph. Then, by adjusting the temperatures of the process gas stream and the solvents, sizes of absorption towers and pressure, and gas and solvent flow rates, all of the $H_2O$, gaseous impurities and a portion of the $CO_2$ may be separated from the process gas stream. By this means the $CO_2$ content of the process gas stream may be reduced to a value in the range of about 0.5 to 20 mole %.

The process gas stream is then adjusted by conventional means such as in a heater to a temperature in the range of about 390°F. to 1000°F. prior to its introduction into the catalytic methanation zone.

The catalytic production of methane from carbon monoxide and carbon dioxide is highly exothermic. Unless the heat is successfully removed from the catalyst bed, high feed-gas throughputs can produce excessive catalystbed temperatures that can destroy the activity of the catalyst and reduce methane yields. Temperature control may be effected by any of the following techniques: distribution of the feed-gas stream throughout fixed bed reactors by means of separate inlet points, embedding tubular coolers in the catalyst beds and producing steam which may be used elsewhere in the process, cooling the effluent gas between beds with simultaneous steam generation, or by using a free-flow tubular reactor whose inside surfaces are coated with catalyst.

Another method of controlling catalyst-bed temperatures while increasing the concentration of methane in the product gas consists of recycling a portion of the product gases through the catalyst bed at ratios ranging from 0.5–50 volumes of recycle gas per volume of fresh feed gas and preferably at recycle ratios in the range of 1 to 5.

The Group VIII transition elements, mainly iron, nickel, and cobalt, appear to be the most suitable for use as methanation catalysts. Typical commercial preparations contain about 33 to 78 weight percent of nickel oxide and about 12 to 25 percent of aluminum oxide and are used in the form of ⅜ inch × ⅜ inch or ¼ inch × ¼ inch cylindrical tablets. A typical nickel oxide catalyst is Girdler G65 produced by Chemetron Corp. Suitable catalyst compositions include the following: $NiO-Al_2O_3$ or NiO-MgO precipitated on kaolin and reduced with hydrogen; and also in parts by weight Ni 100, $ThO_2$ 6, MgO 12, and Kieselguhr (diatomaceous earth) 400 reduced with hydrogen for 2 hours at 752°F. followed by heating for 100 hours at 932°F. The life of the catalyst may be extended by maintaining the sulfur level in the reactant gases below about 0.005 grains of sulfur per thousand standard cubic feet. The reaction temperature in the methanator is in the range of about 390° to 1500°F, and suitably 400° to 700°F. Methane production varies inversely with reaction temperature and directly with pressure. For example the exit temperature for the aforesaid NiO-Al₂O₃ catalyst may be about 662°F. Space velocities range from 100 to 10,000 standard volumes of gas per volume of catalyst ($hr^{-1}$) and pressure in the methanator is substantially the same as that in the gas generator less any ordinary drop in the line.

The effluent gas from the methanator catalytic reactor comprises about 50 to 60 volume percent of methane or higher along with one or more members of the group CO, $H_2$, $H_2O$, $CO_2$, $N_2$ and Ar. The water in the effluent gas stream may be condensed out and any $CO_2$ is removed in the manner described previously, leaving substantially pure methane (92–98 volume percent or greater). If required, cryogenic refrigeration may be used to separate the methane from nitrogen and argon which may be present in the amount of about 0.1 to .6 volume percent, depending of the purity of the oxygen gas feed to the generator.

In another embodiment of the invention for use with sulfur-containing hydrocarbonaceous fuels containing 1.0 to 7.0 wt. % sulfur such as liquid hydrocarbon fuel oil or high sulfur coal or mixtures thereof, a unique sulfur resistant methanation catalyst comprising in wt. % CoO 3 to 4, $MoO_3$ 9.5 to 16 and the remainder alumina, and preferably in wt. % CoO 3.2, $MoO_3$ 15.7 and $Al_2O_3$ is used as the catalyst in the mathanation step. In this second embodiment, the effluent gas stream from the generator having a $H_2$/CO mole ratio in the range of greater than 1.0 to 3.0 is cooled to a temperature in the range of about 300° to 800°F. by direct or indirect heat exchange as previously described. Substantially all of the $H_2O$ and the particulate carbon are removed, and the $CO_2$ content is adjusted to a value in the range of about 0.5 to 20 mole %. The process gas stream is introduced into the catalytic methanator where the $H_2$ and CO are reacted together at a temperature in the range of about 500° to 1500°F., such as 500° to 800°F., and at a pressure in the range of about 1 to 250 atmospheres. The effluent gas stream from the methanation zone comprises mixtures of $CH_4$ and one or more members of the group $H_2$, CO, $H_2O$, $CO_2$, COS, $H_2S$, $N_2$ and Ar. This effluent gas stream is cooled and one or more members of said group are removed in a conventional gas purification zone. For example, $H_2O$, $CO_2$, $H_2S$, and COS may be removed. A methane-rich product gas stream is produced comprising: $CH_4$ 92 to 98; CO 0.1 to 2.0; $H_2$ 0.5 to 6.0; and $N_2$+Ar 0.1 to 0.8.

By the subject invention, a clean fuel gas may be produced. This process has the following significant advantages over other schemes for making fuel gas:

1. Oxygen requirements will be reduced in comparison with coassigned U.S. Pat. No. 3,688,438 since the generator will operate at a lower O/C ratio.
2. Substantial reduction in generator and waste heat boiler size since the large steam volume will have been reduced by about 20 percent.
3. The shift converter (either thermal or catalytic) proposed in some other schemes can be eliminated since the 3:1 $H_2$:CO ratio is no longer required as feed to the methanator.
4. A maximum yield of desirable products i.e. $H_2$+CO+$CH_4$ are obtained at the same generator temperature and soot production.
5. With sulfur resistant catalysts, it is not necessary to remove $H_2S$ and COS, at least not completely, before the methanator. Thus, if a gas purification step is required, it may be performed once only after the methanation step.

EXAMPLES

The following examples are offered as a better understanding of the present invention but the invention is not to be construed as unnecessarily limited thereto.

EXAMPLE I

Run No. 1 - On an hourly basis about 152 pounds of California vacuum residuum feedstock at a temperature of 205°F. are introduced into a free-flow non-catalytic synthesis gas generator by way of an annulus-type burner. The oil feedstock has an API gravity of 9.9, a viscosity of 401 Saybolt seconds Furol 122°F., and a heat of combustion of 18145 British Thermal Units per pound. The oil feedstock has the following ultimate analysis in weight %: C 86.0, H 10.7, O 0.0, N 0.6, S 2.3, and ash 0.3.

Simultaneously, 628 pounds of steam at a temperature of 720°F. and 1798 SCFH (Standard Cubic Feet per Hour) of substantially pure oxygen (95 mole % $O_2$ or more) at a temperature of 78°F. are charged into the gas generator. The weight ratio $H_2O$/fuel is 3.9 and the atomic ratio of $O_2$ in the substantially pure oxygen to carbon in the fuel is 0.81.

Reaction takes place between the feedstreams in the reaction zone at a pressure of about 74 atmospheres and at an autogenous temperature of 1910°F. The average residence time in the 2.2 cubic ft. reaction zone is about 7 seconds. By the partial oxidation reaction, the hydrocarbonaceous feedstream is converted into 5827 SCFH of an effluent gas stream having the following dry gas composition in mole percent: CO 12.3, $H_2$ 34.6, $CO_2$ 32.0, $CH_4$ 20.5, $N_2$ 0.2, $H_2S$ 0.3, COS 0.0, and Ar 0.1. In addition, 14.3 pounds per hour of particulate carbon is entrained in the effluent gas stream from the gas generator.

The process gas stream leaving the gas generator is cooled to a temperature of 500°F. by indirect heat exchange with water in a waste heat boiler. Simultaneously, steam for recycle to the gas generator is produced in the waste heat boiler. In a manner previously described, the particulate carbon is scrubbed from the process gas stream and water and substantially all of the acid gases e.g., $CO_2$, $H_2S$, COS are removed in an acid gas separation zone. A stream of 98 mole % $CO_2$ is removed from the acid gas separation zone. The stream of $H_2S$ and COS is passed into a Claus unit to produce sulfur. A stream of dry synthesis gas substantially comprising $H_2$ and CO having a mole ratio of about 2.8 is produced.

The aforesaid stream of dry synthesis gas at a temperature of 180°F. and a pressure of 1075 psia is mixed with 695 SCF of substantially pure $CO_2$ from the acid gas separation zone. The dry process gas stream then contains in mole % $H_2$ 43.44, CO 15.46, $CH_4$ 25.77, $CO_2$ 15.00, $H_2S$ + COS less than 500 parts per million (ppm), $N_2$ 0.25, and Ar 0.08.

At a space velocity of 1000 standard volumes of gas per volume of catalyst per hour and at 400°F. the aforesaid stream of synthesis gas is introduced into a catalytic methanation zone. The methanation catalyst comprises in parts by weight Ni 100, ThO 12 and Kieselguhr 400. $H_2$ and CO are reacted together in the methanation zone at a pressure of about 70 atmospheres gauge. The methane-rich gas stream leaving the methanator at a temperature of 800°F., has the following composition in mole %: $CH_4$ 56.5, $H_2O$ 19.0, $CO_2$ 22.3, $H_2$ 1.5, CO 0.2, and $N_2$+Ar 0.5.

By methods previously described, $H_2O$ and $CO_2$ are removed from the process gas stream to produce 1935 SCFH of methane-rich gas having a gross heating value of 983 BTU/SCF and the following composition in mole %: $CH_4$ 96.42, $H_2$ 2.48, CO 0.31 and N+Ar 0.79.

EXAMPLE II

This example demonstrates the unobvious critical relationship between the mole % $CO_2$ in the feedgas to the methanator and the gross heating value of the effluent gas from the methanator after the removal of $CO_2$ and $H_2O$.

The process described in Example I is repeated. The mole ratio $H_2/CO$ in the feedgas stream to the methanator is held at 2.8. A series of runs are made with the mole % $CO_2$ in the feedgas to the methanator being in the range of 0 to 50. The gross heating value of the effluent gas stream from the methanation zone after the removal of $H_2O$ and $CO_2$ for these runs varies in the range of about 950 BTU/SCF for 0 mole % $CO_2$ in the feed gas to the methanator to a maximum value of 983 BTU/SCF for 15 mole % $CO_2$ in the feed gas to the methanator at 700°K and 70 atmospheres gage.

Obviously many modifications and variations of the invention as hereinbefore set forth may be made without departing from the spirit and scope thereof, and only such limitations should be imposed as are indicated in the appended claims.

We claim:

1. A process for producing a methane-rich gas stream comprising the steps of (1) reacting a hydrocarbonaceous fuel with substantially pure oxygen comprising 95 mole % $O_2$ or more by partial oxidation in the presence of a temperature moderator selected from the group consisting of $H_2O$, $CO_2$, and mixtures thereof in the reaction zone of a free-flow unpacked noncatalytic synthesis gas generator, at an autogenous temperature in the range of about 1700 to 3100°F., and a pressure in the range of about 1 to 250 atmospheres gauge wherein the weight ratio of $H_2O$/hydrocarbonaceous fuel is in the range of 0.5 to 5.0, the atomic ratio of oxygen in the substantially pure oxygen to carbon in the hydrocarbonaceous fuel is in the range of about 0.8 to 1.0, and the stream of effluent gas leaving said synthesis gas generator comprises mixtures of $H_2$ and more than 10 mole % CO having a mole ratio $H_2/CO$ in the range of greater than 1.0 to no greater than 3.0, $H_2O$, $CH_4$, $CO_2$, particulate carbon, and gaseous impurities selected from the group consisting of COS, $H_2S$, Ar, $N_2$, and mixtures thereof; (2) cooling the process gas stream from (1), and removing particulate carbon, $H_2O$, at least a portion of said $CO_2$, and said gaseous impurities therefrom; (3) adjusting the mole % $CO_2$ in the clean process gas stream from (2) to a value in the range of about 0.5 to 20 and a mole ratio $H_2/CO_2$ in the range of about 2 to 60, and a temperature in the range of about 390°F to 1000°F; (4) introducing the process gas stream from (3) without a separate water-gas shift step into a catalytic methanation zone where said $H_2$ and CO are reacted together while in contact with a methanation catalyst at a pressure in the range of about 1 to 250 atm. to produce an effluent gas stream comprising $CH_4$ and containing one or more members of the group consisting of CO, $H_2$, $H_2O$, and $CO_2$; and (5) cooling and separating one or more of said members from the effluent gas stream from (4), producing said methane-rich gas stream having a gross heating value of 940 BTU/SCF or more.

2. The process of claim 1 wherein the gas stream from step (5) comprises to 98 mole % of methane (dry basis).

3. The process of claim 1 where in step (2) all of the $CO_2$ is removed from the process gas stream and recovered as a stream of substantially pure $CO_2$ and provided with the additional step of returning a portion of said $CO_2$ into the process gas stream in step (3) to adjust the mole % $CO_2$.

4. The process of claim 1 where in step (2) a portion of the $CO_2$ in the process gas stream is removed by absorption in a solvent.

5. The process of claim 1 where in step (1) said temperature moderator is $H_2O$ and the $H_2O$/hydrocarbonaceous fuel weight ratio is in the range of about 2 to 5, said pressure is in the range of 20 to 200 atmospheres gauge, said substantially pure oxygen comprises 99 mole % $O_2$ or more, said $H_2/CO$ mole ratio is in the range of about 2.2 to 2.8; in step (3) the mole % $CO_2$ in the process gas stream is adjusted to a value in the range of 1.0 to 15.0 and the mole ratio $H_2/CO_2$ is in the range of about 2 to 4, and the methane-rich gas stream from step (4) has a gross heating value in the range of 940 to 1000 BTU/SCF.

6. The process of claim 1 wherein the pressure in said synthesis gas generator is in the range of about 20 to 200 atmospheres.

7. The process of claim 1 wherein the pressure in steps (2) to (5) is substantially the same as in the gas generator in step (1), less ordinary drop in the lines.

8. The process of claim 1 wherein at least a portion of the hydrocarbonaceous fuel feed in step (1) comprises a pumpable slurry of a solid hydrocarbonaceous fuel selected from the group consisting of the particulate carbon separated in step (2), coal, and petroleum coke in admixture with a liquid selected from the group consisting of liquid hydrocarbon fuel and water.

9. The process of claim 1 wherein the hydrocarbonaceous fuel feed in step (1) is a liquid hydrocarbon selected from the group consisting of petroleum distillate, naphtha, asphalt, gas oil, residual fuel, reduced crude, whole crude, coal tar, coal oil, shale oil, tar sand oil, and mixtures thereof.

10. The process of claim 1 wherein said substantially pure oxygen comprises 99 mole % $O_2$ or more.

11. The process of claim 1 wherein the methanation catalyst in step (4) comprises nickel oxide and aluminum oxide and the space velocity is in the range of about 100 to 10,000 standard volumes of gas per volume of catalyst per hour.

12. The process of claim 1 wherein prior to being introduced into the methanation zone in step (4) the process gas stream is preheated by noncontact indirect heat exchange with at least a portion of the effluent gas stream produced subsequently in the process in said methanation zone.

13. A process for producing a methane-rich gas stream from a stream of synthesis gas comprising $H_2$ and CO comprising: (1) producing said synthesis gas having more than 10 mole % CO and with a mole ratio $H_2/CO$ in the range of greater than 1.0 to no greater than 3.0; (2) adjusting the mole % $CO_2$ in the synthesis gas stream to a value in the range of about 1 to 15, and the $H_2/CO_2$ mole ratio in the range of about 2 to 60 either by removing excess $CO_2$ or by adding supplemental $CO_2$ as required; (3) preheating the process gas stream from (2) to a temperature in the range of about 390° to 1000°F by noncontact indirect heat exchange with at least a portion of the effluent gas stream from the methanation zone downstream in the process; (4) introducing the preheated process gas stream from (3) without a separate watergas shift step into a catalytic methanation zone where said $H_2$ and CO are reacted together while in contact with a methanation catalyst at a pressure in the range of about 1 to 250 atmospheres to produce a methane-rich gas stream comprising a mixture of $CH_4$ and one or more members of the group $H_2O$, $CO_2$, CO, $H_2$, $N_2$ and Ar; and (5) cooling and separating one or more of said members from the methane-rich gas stream from (4), thereby producing said methane-rich gas stream having a gross heating value of 940 BTU/SCF or more.

14. A process for producing a methane-rich gas stream comprising the steps of (1) reacting a sulfur-containing hydrocarbonaceous fuel feed by partial oxidation with substantially pure oxygen comprising 95 mole % $O_2$ or more and a temperature moderator selected from the group consisting of $H_2O$, $CO_2$, and mixtures thereof at an autogenous temperature in the range of about 1700° to 3100°F., and a pressure in the range of about 20 to 200 atmospheres gauge in the reaction zone of a free-flow unpacked noncatalytic synthesis gas generator, wherein the weight ratio of $H_2O$/hydrocarbonaceous fuel is in the range of 0.50 to 5.0, the atomic ratio of oxygen in the substantially pure oxygen to carbon in the hydrocarbonaceous fuel is in the range of about 0.80 to 1.0, and the stream of effluent gas leaving said synthesis gas generator principally comprises $H_2$ and more than 10 mole % of CO having a mole ratio $H_2$/CO in the range greater than 1.13 to no greater than 3.0, $H_2O$, $CH_4$, $CO_2$, and minor amounts of particulate carbon, and one or more members of the group of gaseous impurities COS, $H_2S$, Ar, and $N_2$; (2) cooling the process gas stream from (1) and removing particulate carbon, and $H_2O$; (3) adjusting the mole % $CO_2$ in the process gas stream to a value in the range of about 10 to 15 and the temperature to a value in the range of about 390°F to 1000°F, and adjusting the mole ratio $H_2$/$CO_2$ to a value in the range of 2 to 4 either by removing excess $CO_2$ or by adding supplemental $CO_2$ as required; (4) introducing the process gas stream from (3) without a separate water-gas shift into a catalytic methanation zone where said $H_2$ and CO are reacted together while in contact with a sulfur-resistant methanation catalyst at a temperature in the range of about 500° to 1500°F. and at a pressure in the range of about 20 to 200 atmospheres to produce an effluent gas stream comprising $CH_4$ and one or more members of the group of gaseous impurities $H_2O$, $CO_2$, COS, $H_2S$, Ar, and $N_2$, and (5) separating said impurities from the effluent gas stream from (4), producing said methane-rich gas stream.

15. The process of claim 14 wherein the sulfurresistant methanation catalyst in step (4) comprises in wt. % CoO 3 to 4, $MoO_3$ 9.5 to 16, and the remainder alumina.

16. The process of claim 14 where in step (3) a portion of the $CO_2$ in the process gas stream is removed by absorption in a solvent so as to adjust the mole % $CO_2$.

* * * * *